United States Patent
Peltier et al.

(10) Patent No.: US 9,803,556 B2
(45) Date of Patent: Oct. 31, 2017

(54) DRIVE GEARBOX ON A TURBOMACHINE, CONSISTING OF A DRIVE TRAIN WITH GEAR LINES EXTENDING INTO NON-PARALLEL PLANES

(71) Applicants: SNECMA, Paris (FR); HISPANO SUIZA, Colombes (FR)

(72) Inventors: Jordane Peltier, Paris (FR); Frantz Armange, Chilly Mazarin (FR); Lambert Olivier Marie Demoulin, Paris (FR); Alain Pierre Garassino, Crisenoy (FR); Nuria Llamas Castro, Savigny sur Orge (FR); Stephane Prunera-Usach, Rueil Malmaison (FR); Bellal Waissi, Vert Saint Denis (FR)

(73) Assignees: SNECMA, Paris (FR); HISPANO SUIZA, Colombes (FR)

( * ) Notice: Subject to any disclaimer, the term of this patent is extended or adjusted under 35 U.S.C. 154(b) by 233 days.

(21) Appl. No.: 14/423,801

(22) PCT Filed: Sep. 3, 2013

(86) PCT No.: PCT/FR2013/052021
§ 371 (c)(1),
(2) Date: Feb. 25, 2015

(87) PCT Pub. No.: WO2014/033416
PCT Pub. Date: Mar. 6, 2014

(65) Prior Publication Data
US 2015/0204246 A1    Jul. 23, 2015

(30) Foreign Application Priority Data

Sep. 3, 2012 (FR) .................................... 12 58196

(51) Int. Cl.
*F16H 1/20*    (2006.01)
*F02C 7/32*    (2006.01)

(52) U.S. Cl.
CPC ............... *F02C 7/32* (2013.01); *F16H 1/203* (2013.01); *F05D 2250/38* (2013.01); *F05D 2260/4031* (2013.01); *Y10T 74/1966* (2015.01)

(58) Field of Classification Search
CPC ......... F02C 7/32; B60K 25/00; F16H 57/033; F16H 1/203
(Continued)

(56) References Cited

U.S. PATENT DOCUMENTS 2,978,869 A    4/1961   Hiscock et al.
8,973,465 B2*  3/2015   Duong .................... F16H 1/222
                                                           60/802

(Continued)

FOREIGN PATENT DOCUMENTS

EP    2123883 A2    11/2009
EP    2390486 A2    11/2011

(Continued)

OTHER PUBLICATIONS

French Search Report issued May 23, 2013 in French Application No. 1258196 filed Sep. 3, 2012.

(Continued)

*Primary Examiner* — William C Joyce
(74) *Attorney, Agent, or Firm* — Oblon, McClelland, Maier & Neustadt, L.L.P.

(57) ABSTRACT

A gearbox to be mounted on a turbomachine and driven by a radial drive shaft of the latter. The gearbox has a three-dimensional or sinuous shape, which can house a large quantity of equipment to be driven, without occupying a large amount of space in any dimension, since the gearbox remains close to the turbomachine and the equipment can be (Continued)

distributed over a large surface. The drive train of gears successively extends into several non-parallel planes and comprises an axial branch on the turbomachine and a branch forming an arc of circle around the turbomachine.

10 Claims, 3 Drawing Sheets

(58) Field of Classification Search
USPC .............................................. 74/606 R, 665 F
See application file for complete search history.

(56) References Cited

U.S. PATENT DOCUMENTS

| | | |
|---|---|---|
| 9,316,158 B2 * | 4/2016 | Peltier ........................ F02C 7/32 |
| 2009/0290976 A1 | 11/2009 | Suciu et al. |
| 2011/0289936 A1 | 12/2011 | Suciu et al. |
| 2012/0117981 A1 | 5/2012 | Suciu et al. |
| 2012/0159966 A1 | 6/2012 | Suciu et al. |

FOREIGN PATENT DOCUMENTS

| | | | |
|---|---|---|---|
| EP | 2455597 A2 | | 5/2012 |
| FR | 3 014 954 | * | 6/2015 |
| GB | 1212109 A | | 11/1970 |

OTHER PUBLICATIONS

International Search Report issued Nov. 6, 2013 in PCT/FR2013/052021 filed Sep. 3, 2013.

\* cited by examiner

DRIVE GEARBOX ON A TURBOMACHINE, CONSISTING OF A DRIVE TRAIN WITH GEAR LINES EXTENDING INTO NON-PARALLEL PLANES

BACKGROUND OF THE INVENTION

Field of the Invention

The invention relates to a drive gearbox on a turbomachine, intended to transmit the movement originating from the turbomachine by the intermediary of a radial shaft exiting from the latter, and to transmit it to various pieces of equipment annexed to the turbomachine, such as pumps, electricity generators, etc., which are indispensables for the operation of the turbomachine or to other devices of an aircraft propelled by this turbomachine. The transmission is carried out via a drive train comprised of successive gears; this train is here comprised of gear lines located in non-parallel planes.

Discussion of the Background

Gear lines here refers to a set of adjacent gears, meshing in principle between them, of which the gear wheels are located in the same plane or in parallel planes; in other terms, the axes of rotation of the gear wheels are all parallel (perpendicular to this plane or to its parallel planes), and it is considered that the gear wheels that mesh directly together extend into the same plane; the gear line can however continue into parallel planes if there are gear wheels aligned along the same axis of rotation or of the offsets of toothing in the same gearing.

The gearbox primarily comprises a drive train comprised of all of the gear wheels, meshing together in such a way as to transmit a movement, inside a casing. This train is connected to the radial shaft of the turbomachine and to drive shafts of the equipment. The gearbox is fixed to the turbomachine at the desired position and the equipment itself is fixed to the gearbox. A document describing a gearbox of known design is U.S. application Ser. No. 12/0006137. It succinctly represents therein the drive shaft 12 of the turbomachine, with the radial shaft 14 and the gearbox properly speaking, comprising a drive train comprised of gear wheels 16 with straight toothing in a casing 10. The equipment 22 is located on the box opposite the fastening to the turbomachine. As all of the axes of the gear wheels 16 are parallel, the gearbox of this document from prior art comprises a single gear line in the sense of the invention.

It is sought to decrease the space occupied of the assembly comprising the gearbox and the equipment on the turbomachine. The design described in the document or prior art is insufficient from these standpoints, since the drive train of the box is extended in a direction and therefore occupies a large amount of space.

More generally, the existing gearboxes belong to two different types: the single-face type, where the equipment is placed on a single face of the box, and the double-face type, wherein they are placed on two opposite faces. In the first design, the box must be of great length and the angular amount of space occupied around the turbomachine is generally substantial (often 200°), and, in the second design, it is the space occupied in the axial direction that is substantial.

SUMMARY OF THE INVENTION

This invention relates to a gearbox that is improved under these various aspects, and which in particular offers a large degree of design freedom, able to bring a reduction of the space occupied by the assembly comprised of the box and of all of the equipment that it carries.

Very generally, the conventional design is renounced wherein the drive train is comprised of a single gear line extending in a plane, possible in a single direction, or in parallel planes, as is the case in the document U.S. application Ser. No. 12/0006137, or in the parallel branches and in the secant planes as in EP-2 455 597-A.

In a general form, the invention relates to a gearbox to be fixed to a turbomachine in order to drive at least one piece of equipment annexed to the turbomachine, comprising a casing, a drive train internal to the casing and comprising a series of gears, as well as a drive member intended to mesh with a drive shaft of the turbomachine, with the casing comprising fastening points to the turbomachine and to the equipment, wherein the drive train comprises at least two gear lines located in non-parallel planes and connected together by a junction gear to a junction interface, comprised of a pair of gear wheels with non-parallel axes, of which, characteristically, at least one end line housed in a casing branch that has a main extension in a substantially axial direction of the turbomachine when the box is fixed to the turbomachine, and another line housed in an intermediate casing branch substantially in the portion of a circle, substantially perpendicular to the end branch and which surrounds a portion of circumference of the turbomachine when the box is fixed to the turbomachine.

The construction of the drive train in several gear lines located in non-parallel planes makes it possible to have a gearbox even of large dimensions entirely within the vicinity of the casing of the turbomachine, without occupying an excessive amount of space not in the radial direction or in the axial direction or in the angular direction, as the box is not rectilinear. There is in addition a large choice of faces of the gearbox, extending in very different directions, in order to place equipment therein, which also contributes in limiting the space taken up by the assembly.

In a particular embodiment, the gearbox comprises three of said gear lines of which two end lines that have directions of extension that are substantially parallel between each other and an intermediate line that joins these end lines; these end lines can be housed in substantially rectilinear branches of the casing and that have main extensions in a substantially axial direction of the turbomachine when the box is fixed to the turbomachine; the intermediate line can be housed in another branch of the carter which is an intermediate branch close to a portion of circle, primarily perpendicular to the end branches and which surrounds a portion of circumference of the turbomachine when the box is fixed to the latter.

Such an embodiment particularly shows how much the encumbrance of the gearbox can be limited with the invention: the axial extension of the gearbox is reduced thanks to the division of the drive train into two lines that can extend on either side of the turbomachine, while the intermediate branch itself has a very low axial encumbrance, and its angular encumbrance is advantageously equal to or less than a half-turn, which greatly facilitates the installation of the gearbox on the turbomachine, while the known single-face gear boxes often have a more substantial angular extension that makes the assembly more constraining.

In another design, which also exploits the division of the drive train into two lines extending in primarily parallel directions, these two lines belong however to secant planes, and the drive train has a junction portion with longitudinal ends of gear lines; the latter are housed in respective branches of the casing which are attached to one another at an edge and together have a v-shaped section according to cross-sections perpendicular to a main extension direction of the gearbox.

The angular space occupied by the gearbox is here further reduced; at the price of a moderate axial encumbrance, a casing is available that has a large surface for placing equipment, on faces that have orientations that are very different from one another.

The successive gear lines comprising the drive train can be connected by conical pinions to the ends of these gear lines and which define junction gears with non-parallel axes, which can be concurrent but not necessarily.

BRIEF DESCRIPTION OF THE DRAWINGS

Some embodiments of the invention shall now be described by means of the following figures; it is clear that other embodiments are possible and that this description is purely for the purposes of illustration.

DETAILED DESCRIPTION OF THE PREFERRED EMBODIMENTS

Figure 1:
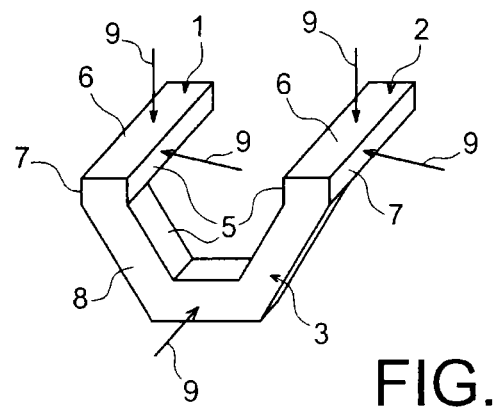
FIGS. 1, 2, 3 and 4 show an embodiment of the invention.
Figure 2:
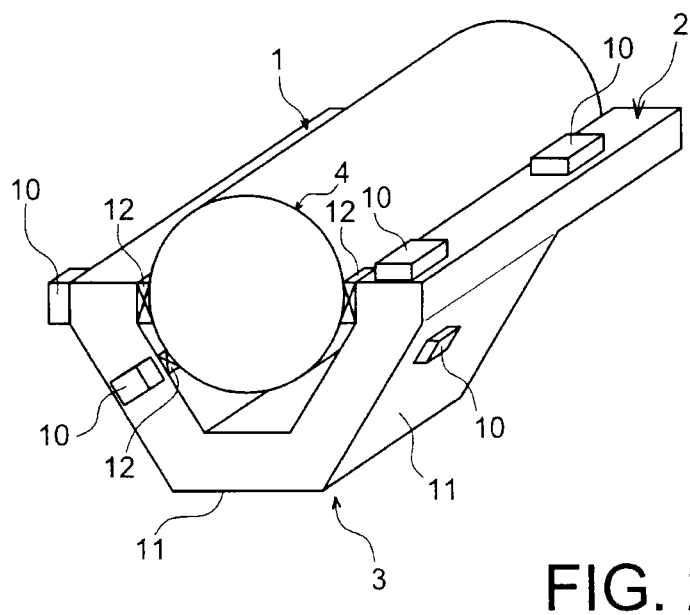

An embodiment of the invention is described by means of figures. The gearbox has the general shape shown in FIG. 1, with a three-dimensional shape comprising two end branches 1 and 2 that are substantially parallel and rectilinear (a slight curvature, shown in FIG. 3, being possible however) and an intermediate branch 3 that is substantially in the portion of a circle that connects the latter and which is substantially perpendicular to them. FIG. 2 shows that this gearbox can be advantageously placed around a turbomachine 4, for example in the location of a high-pressure body of the latter, by placing the end branches 1 and 2 in the axial direction of said turbomachine, with diametrically opposite cone distances, with the intermediate branch 3 then also next to the turbomachine 4 by making substantially a half-turn around it, or less. The gearbox can comprise a different number of branches extending in the axis of the turbomachine 4, a single for example, or more than two, and the intermediate branch 3 can have an angular extension that is smaller than an approximate half-turn. A large choice is therefore available for the location of the drive chain of the turbomachine 4, which can be done directly using a conventional radial shaft belonging to the turbomachine 4, or by the intermediary of an intermediate shaft belonging to a separate box and meshing with the radial shaft. A radial shaft can as such extend up to an internal face 5 (directed towards the turbomachine 4) of any one of the branches 1, 2 and 3, although an intermediate shaft can extend to one of the outside faces of one of the branches 1 to 3. This can in particular be one of the upper faces 6 (substantially in the plane of the sector of the turbomachine 4) for the end branches 1 and 2, one of the peripheral faces 7 (directed radially outwards) for the same branches, or a front face 8 (directed axially opposite the end branches 1 and 2) of the intermediate branch 3. Some of the possibilities for the positions of the drive shaft (radial or intermediate) are indicated by reference 9, in FIG. 1.

The equipment 10 can be mounted itself on the opposite upper 6, peripheral 7 and axial 8 faces, as well as on radially external faces 11 of the intermediate branch 3. There is again a large choice for the fastening of the gearbox to the turbomachine 4, which can take place by bolting of the points of fastening 12 located on the casing 13, using possibly wedges or other intermediate supports between the turbomachine 4 and, for example, some of the internal faces 5. The pieces of equipment 10 are fixed to the casing 13 by other fastening points 12.

This gearbox generally provides a very large choice in the possibilities for arrangement as well as the possibility to install a large number of piece of equipment 10, while still retaining a moderate encumbrance in all directions (axial, radial and angular) of the turbomachine 4.

Figure 3:
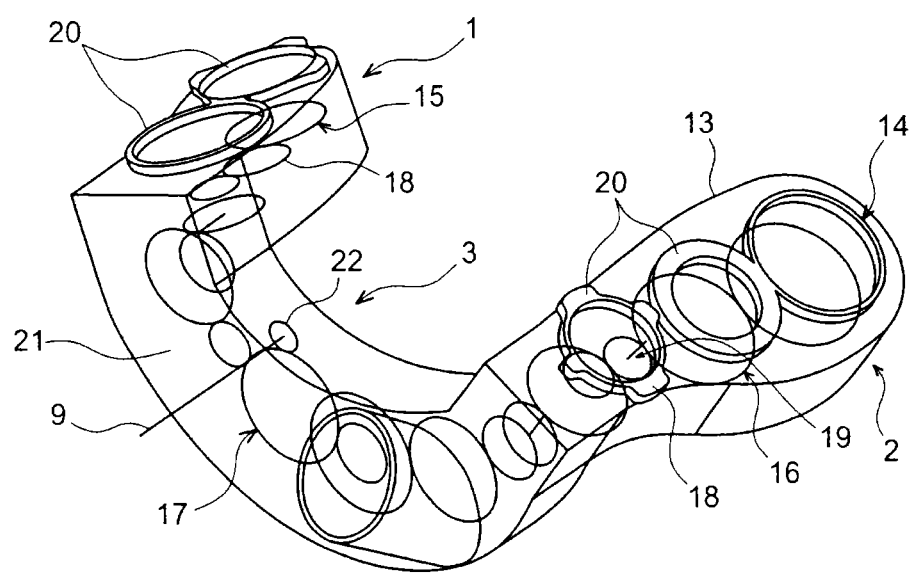

This gearbox shall now be described in more detail. FIG. 3 shows that it is substantially comprised of a casing 13 that defines the contour of the three branches 1, 2 and 3, and of a drive train 14 contained in the casing 13 and wherein three gear lines 15, 16 and 17 can be distinguished, respectively housed in a respective branch 1, 2 and 3. Each one of them comprises gear wheels 18 generally with a straight toothing meshing between them in order to form straight gears, with the axes 19 of some of these gear wheels 18 being used to drive in rotation the mobile portions of the equipment 10, by passing through openings 20 of the casing 13. The axes 19 are all parallel inside of the same gear line 15, 16 or 17, but have directions that are different from one gear line 15, 16 or 17 to another. The number of gear wheels 18, their diameters as well as the positions of the openings 20 defining the drive shafts 19 of the equipment 10 can of course be chosen freely, according to the rotation speeds the one wants to transmit and the positions of the equipment 10. A particular opening 21 is intended at the inlet of the drive shaft 9, which further comprises a drive pinion 22 meshing with any one of the gear wheels 18. The drive pinion 22 is adjacent to the drive train 14, which signifies that the latter would remain continuous in the absence of the former. It would however be possible for the drive pinion to be a gear wheel belonging to the drive train itself.

Figure 4:
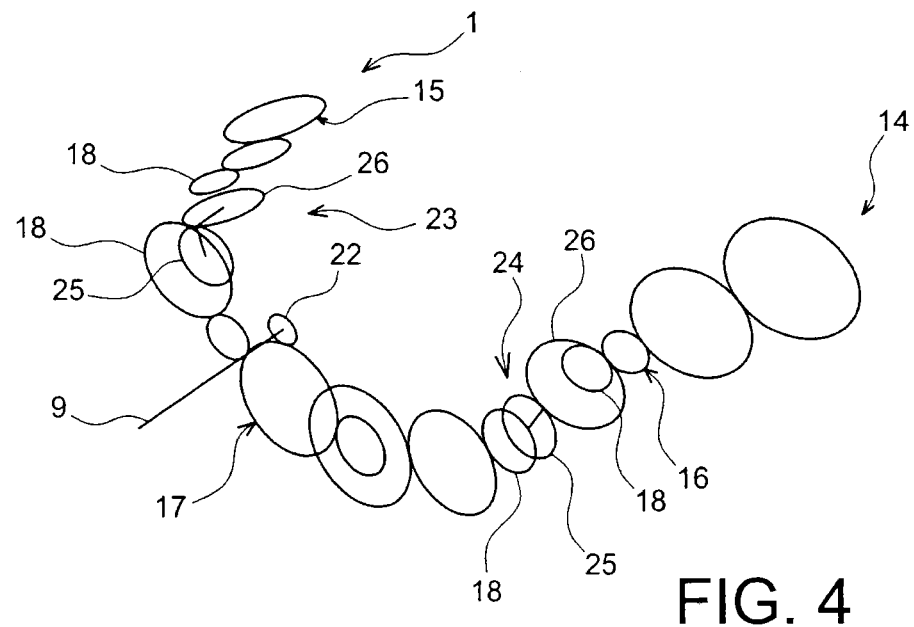

FIG. 4 shows the drive train 14 in an isolated manner. The connection between the three gear lines 15, 16 and 17 is carried out by junction gears 23 and 24 with concurrent or more generally non-parallel axes. Each one of them is comprised of a first conical pinion 25, integral and coaxial with an end gear wheel 18 of the gear line 17, and of a second conical pinion 26, likewise integral and coaxial with a gear wheel 18, of end of one of the gear line 15 or 16. These junction gears 23 and 24 therefore provide the continuity of the drive train 14 and the faculty to move it entirely by the drive pinion 22 alone. They also make it possible to direct each one of the gear lines 15, 16 and 17 in the direction of the branch 1, 2 or 3 respective and in non-parallel planes.

Figure 5:
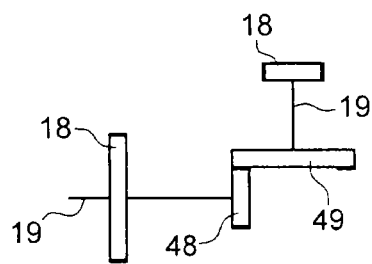
FIG. 5, a possible arrangement for this embodiment or others.

An equivalent design from a kinematic standpoint would consist in replacing the conical pinions 25 and 26 with a straight pinion 48 and a ring gear 49 on a plane, which is shown in FIG. 5, without any other details of the embodiment being modified.

The gear lines 15 and 16 extending into the end branches 1 and 2 of primarily axial extensions also have roughly axial directions of extension and extend in primarily longitudinal planes with respect to the turbomachine 4, while the gear line 17 housed in the intermediate branch 3 of the casing has a direction of extension that is primarily angular like it and belongs to an essential transversal plane of the turbomachine 4.

The invention claimed is:
1. A gearbox to be fixed to a turbomachine in order to drive at least one piece of equipment annexed to the turbomachine, comprising a casing, a drive train internal to the casing and comprising a series of gears, as well as a drive member intended to mesh with a transmission shaft of the turbomachine, with the casing comprising fastening points to the turbomachine and to the equipment, wherein the drive train comprises at least two gear lines located in non-parallel planes and connected together by a junction gear to a junction interface, comprised of a pair of gear wheels with non-parallel axes, of which, at least one end line housed in an end casing branch that has a main extension in a substantially axial direction of the turbomachine when the box is fixed to the turbomachine, and another line, housed in an intermediate casing branch, the intermediate casing branch being curved in a portion of a circle, substantially perpendicular to the end branch and which surrounds a portion of circumference of the turbomachine when the box is fixed to the turbomachine, wherein said another line belongs to an essential transversal plane of the turbomachine.

2. The gearbox according to claim 1, comprising two said end lines, that have directions of extension that are substantially parallel between them and substantially perpendicular to said other branch.

3. The gearbox according to claim 2, wherein the end lines extend to diametrically opposite generatrices of the turbomachine.

4. The gearbox as claimed in claim 1, wherein the drive train is continuous and comprises a gear wheel meshing with a drive pinion that belongs to the transmission shaft, with the drive pinion being adjacent to the drive train.

5. The gearbox as claimed in claim 4, wherein the drive pinion belongs to the drive train.

6. The gearbox as claimed in claim 1, wherein the junction gears with non-parallel axes are comprised of conical pinions that are coaxial with other gear wheels of the drive train.

7. A gearbox to be fixed to a turbomachine in order to drive at least one piece of equipment annexed to the turbomachine, comprising a casing, a drive train internal to the casing and comprising a series of gears, as well as a drive member intended to mesh with a transmission shaft of the turbomachine, with the casing comprising fastening points to the turbomachine and to the equipment, wherein the drive train comprises at least two gear lines located in non-parallel planes and connected together by a junction gear to a junction interface, comprised of a pair of gear wheels with non-parallel axes, of which, at least one end line housed in an end casing branch that has a main extension in a substantially axial direction of the turbomachine when the box is fixed to the turbomachine, and another line, housed in an intermediate casing branch, the intermediate casing branch being curved, substantially perpendicular to the end branch and which surrounds a portion of circumference of the turbomachine when the box is fixed to the turbomachine, wherein said another line belongs to an essential transversal plane of the turbomachine, and wherein the end lines extend to diametrically opposite generatrices of the turbomachine.

8. The gearbox as claimed in claim 7, wherein the drive train is continuous and comprises a gear wheel meshing with a drive pinion that belongs to the transmission shaft, with the drive pinion being adjacent to the drive train.

9. The gearbox as claimed in claim 8, wherein the drive pinion belongs to the drive train.

10. The gearbox as claimed in claim 7, wherein the junction gears with non-parallel axes are comprised of conical pinions that are coaxial with other gear wheels of the drive train.

* * * * *